(12) United States Patent
Giovannini et al.

(10) Patent No.: US 8,647,016 B2
(45) Date of Patent: Feb. 11, 2014

(54) SUBMARINE PIPELINE TOWING EQUIPMENT, SYSTEM AND PROCESS

(75) Inventors: Umberto Giovannini, Corsico (IT); Christian Cocca, Cinisello Balsamo (IT); Denis Faidutti, Mortegliano (IT)

(73) Assignee: Saipem S.p.A., San Donato Milanese (IT)

( * ) Notice: Subject to any disclaimer, the term of this patent is extended or adjusted under 35 U.S.C. 154(b) by 15 days.

(21) Appl. No.: 13/145,475

(22) PCT Filed: Jan. 20, 2010

(86) PCT No.: PCT/EP2010/000347
§ 371 (c)(1),
(2), (4) Date: Sep. 27, 2011

(87) PCT Pub. No.: WO2010/086116
PCT Pub. Date: Aug. 5, 2010

(65) Prior Publication Data
US 2012/0009021 A1    Jan. 12, 2012

(30) Foreign Application Priority Data
Jan. 27, 2009   (IT) .............................. MI2009A0092

(51) Int. Cl.
*F16L 1/12*      (2006.01)
(52) U.S. Cl.
USPC ........ 405/171; 405/154.1; 405/158; 405/162; 405/173
(58) Field of Classification Search
USPC .............. 405/154.1, 158, 162, 171, 173, 184, 405/200; 441/133
See application file for complete search history.

(56) References Cited

U.S. PATENT DOCUMENTS

| | | | |
|---|---|---|---|
| 4,037,425 A | 7/1977 | Berg | |
| 4,121,529 A | 10/1978 | Smith et al. | |
| 4,138,853 A | 2/1979 | Lamy | |
| 2008/0095583 A1 | 4/2008 | Giovannini et al. | |

FOREIGN PATENT DOCUMENTS

| | | |
|---|---|---|
| GB | 2 435 316 | 8/2007 |
| WO | 2006 045357 | 5/2006 |
| WO | 2008 017463 | 2/2008 |

OTHER PUBLICATIONS

International Search Report issued Mar. 5, 2010 in PCT/EP10/000347 filed Jan. 20, 2010.

*Primary Examiner* — David Bagnell
*Assistant Examiner* — Carib Oquendo
(74) *Attorney, Agent, or Firm* — Oblon, Spivak, McClelland, Maier & Neustadt, L.L.P.

(57) ABSTRACT

A submarine pipeline towing equipment including: a floater of prismatic shape with a horizontal or vertical axis, with a variable or partially variable buoyancy, whose lower base is at least partially open by an opening or hole to operate as an air chamber. The floater includes: at least one inlet including a valve through which air is supplied; at least one outlet including a valve through which air is discharged; an actuator to control the valve to supply air; an actuator to control the valve to discharge air; a mechanism connecting the equipment to the pipeline; a mechanism transferring air to the floater; a mechanism actuating the actuator to control the valve to supply air in function of a predefined level in the floater; and a mechanism actuating the actuator to control the valve to discharge air in function of the distance of the floater itself from the seabed.

8 Claims, 1 Drawing Sheet

SUBMARINE PIPELINE TOWING EQUIPMENT, SYSTEM AND PROCESS

BACKGROUND OF THE INVENTION

1. Field of the Invention

The present invention refers to a submarine pipeline towing system, equipment and process.

More in particular, the invention is related to techniques for laying pipelines in shallow or very deep waters, in areas which are subjected to currents, through towing said pipelines near to the seabed (off-bottom tow).

2. Description of Related Art

In the oil field it is known to use methods and relative equipment for making marine pipeline sections through towing prefabricated "lines" of pipeline from the manufacturing location to the final site. Amongst the various possible methods the so called "off-bottom tow" is considered as being the most widely-used. The pipeline is towed by making it move slightly above the seabed.

Although this method is used, it has some drawbacks, one of which is that, when there are cross currents, the pipeline can move off-course.

In the patent application WO2006/045357 (U. Giovannini and others) some solutions are mentioned concerning and specifically claiming a technique which is based upon a geometric control of the configuration of the pipeline with respect to the seabed and not to the depth through the use of a series of equipment, connected to the pipeline itself, substantially containing floaters, of which at least a part has a variable buoyancy or partially variable buoyancy which, when placed in a predetermined position and at predetermined intervals, give a graduated buoyancy to the pipeline in function of the distance from the bottom so as to obtain a "festoon-like" configuration of the pipeline, i.e., with suspended pipeline sections, at the floaters, alternating with supporting sections.

The same off-bottom tow technique was cited, as mentioned in the patent application PCT, in the U.S. Pat. No. 4,138,853 (J. E. Lamy), which proposes, in order to counteract the cross current, the use of a device, according to various embodiments, with supporting members which are deformable on the vertical plane but transversally rigid.

The solutions proposed by Giovannini and by Lamy are not without drawbacks. Indeed, although the first solution manages to control the buoyancy of the floaters with respect to the seabed, it is also true that in order to keep the position on course, it relies upon a pipeline/seabed friction force which is sufficient to counteract the force of the cross current. This approach is not without risks due to the unpredictability of the nature of the friction force. On the other hand, the solution of Lamy has, in a complementary way, an approach focused on counteracting the force of the current but it does not consider a specific control of the residual weight of the pipeline, in function of its distance from the seabed, with the risk that, it is not possible to effectively control the configuration of the pipeline during the towing or the residual force that its supporting members discharge onto the seabed, when the operative conditions change. A consequence can be a substantial resistance to the advancing movement. Moreover, neither of these techniques consider any way or any device to bring the towed pipeline back into position, in the case in which this has been deviated by the current (for example in situations of serious adverse sea conditions) i.e., in the cases in which it is necessary to change the course of the towed line (for example to impose a curvature on it).

In the patent application WO2008/017463 (C. Cocca) these drawbacks are solved with a device and a method for the submarine pipeline towing in which the vertical and the horizontal plane configuration control functions are integrated, thanks to the actuation of floaters with a variable or partially variable buoyancy and thanks to guide elements which are able to maintain the towing direction by either counteracting the current force or changing direction. These guide elements interact with the seabed with a partial penetration of a substantially vertical element, the plane of which is capable of rotating on a vertical axis, for example a blade or disc.

The solution described by Cocca solves both the problems concerning the determination of the floaters buoyancy, having only to determine the variation margins of the buoyancy and not a precise value thereof, as well as the uncertainties due to the sliding of the pipeline on the bottom, which now travels parallel to the seabed and not in contact with it.

However, there is still a problem relative to the two previous technologies, which consists in the fact that when there are extreme conditions in the surrounding area (irregularity of the seabed, significant wave motion, etc.) the behaviour of the line could be unstable or in any case difficult to control.

SUMMARY

We have found that by using equipment made up of fixed buoyancy floaters together with equipment consisting of particular floaters with a variable or partially variable buoyancy, we are able to solve or substantially reduce such a problem.

The invention introduces a further way to control the vertical configuration of the pipeline, again with the purpose of reducing the force necessary for the towing. The pipeline maintains a "festoon-like" configuration, being lightened by a series of floaters arranged on it at a suitable distance from one another. The towing can also be carried out through tows or suitable traction means (winches) through the connection of a towing cable to the head of the pipeline.

The floaters which must be used are of two types:
  floater with a fixed buoyancy or "passive" floater
  floater with a variable or partially variable buoyancy or "active" floater.

Both "active" and "passive" floaters are always "air chamber" type, made up of prismatic containers suitable for being filled with water or emptied out of water thanks to the emission or to the discharge of air inserted inside, the container remaining open to the surrounding environment through an opening on its lower surface so that it always remains at ambient pressure. The supplying of air is carried out through a suitable pipeline which is common to all the floaters (common rail) and which is in turn connected to one or more compressors.

The pipeline is lightened by a combination of these two floaters in a variable number and arrangement in function of the specific use. In principle, the passive floaters are used to substantially reduce the weight of the pipeline in the water up to the desired value of the residual weight, whereas the active floaters are used to compensate the uncertainties relative to the actual weight of the pipeline compared to the nominal conditions and ensure that the pipeline itself is stable during the pulling operations.

The "passive" floaters used are those already known in the prior art.

Figure 1:
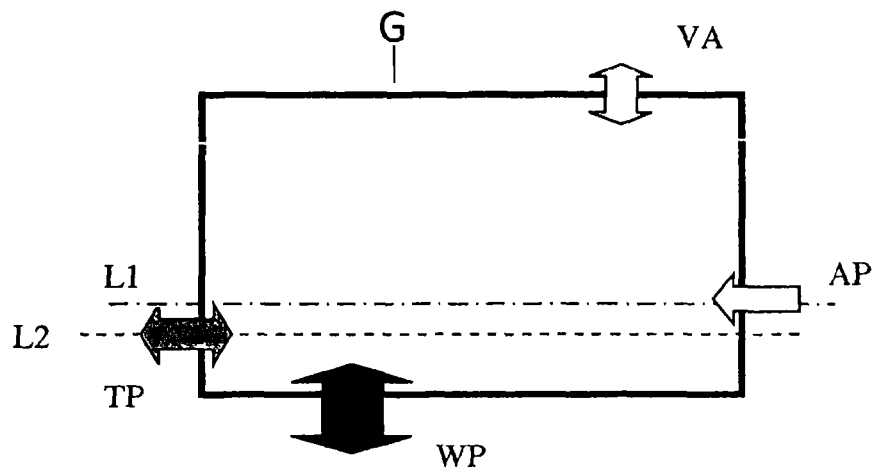
FIG. 1 shows an exemplary embodiment of the submarine pipeline equipment.

With the help of FIG. 1 we describe it briefly.

The "passive" floater is a prismatic container having always two passages and two optional passages:
- a water inlet/outlet bidirectional (WP) passage hole
- an air monodirectional inlet passage made up of a valve (AP)
- a possible inlet/outlet bidirectional "overflow" control passage made up of a hole (TP)
- a possible inlet/outlet bidirectional floater flooding passage made up of a valve (VA)

The passage WP is a hole with a large opening placed on the lower surface of the floater that makes the air chamber. It allows water to be let in or out to flood/empty out the floater without offering a substantial resistance since the hole WP is "sufficiently big" to not induce overpressure inside the floater when water passes through it.

The hole WP should be calibrated in such a manner that the speed with which the water flows out from the hole WP itself towards the outside of the floater, is reduced, said outflow occurring in the case in which the floater suddenly has an ascending motion. The ascending motion of the floater indeed generates an expansion of the air contained inside due to the lower ambient pressure outside (less depth or water head). Basically, by choking the hole WP, the water flow rate expelled by the floater is limited, this causes the air to expand and therefore, in other words, there is an increase in the buoyancy of the floater. It is thus possible to limit the ascending speed of the floater from above to a desired level in function of the diameter of the hole WP and of the surrounding conditions (depth, size of the floater, etc.), said speed being able to be calculated with the known hydrodynamic principles applied to the floater and to the outflow from the hole WP. In this case the floater must have a size so as to withstand the overpressure due to this choking of the passage: the designer must choose the best compromise relative to the strength of the floater (structural requisites) and to the functional requisites.

AP is an air inlet passage (made with a nozzle) to force out water inside the floater. The filling percentage of the floater is predefined at a level L1 and is controlled through a valve which closes the air insertion inside the floater when the desired level L1 is reached. The valve can be controlled electronically (by measuring the level L1), or more simply, mechanically through an active ("flush" type) floater device at the level L1. The valve, supplied continuously upstream, automatically inserts air in the case in which the floater is flooded and in the case in which there is a variation in the free surface of the water with respect to the level L1 by loss of air or air compression due to a change of depth (descent) of the floater. The valve is an on-off type with two states open/closed. TP is a passage positioned on one of the walls of the floater which puts it in communication with the surrounding area. It is made up of a hole (or of a series of holes at various levels selectively able to be plugged) which defines a set level L2 of maximum emptiness: the air inserted into the floater escapes from the hole without further increasing the buoyancy, once this level L2 has been reached. This is a device used to avoid that the floater pushes more than necessary due to a fault of the valve AP or to the expansion of the air inside the floater caused by the lifting of the floater itself. Moreover, in this manner, one floater can be used in projects with a different designed buoyancy without risks.

VA is a passage controlled by a valve (manual) to optionally flood the floater in a rapid manner allowing the air to come out and the water to come in. It is located on top of the floater.

The equipment made up by the "active" floater is new and forms a first object of the invention.

Said equipment, used for submarine pipeline towing, comprises:
- a floater (G), of a prismatic shape with a horizontal or vertical axis, with a variable or partially variable buoyancy, whose lower base is at least partially open by means of an opening or hole (WP) to operate as an "air chamber", having:
  - at least one inlet (AP), made up of a valve, through which air is supplied;
  - at least one outlet (RV), made up of a valve, through which air is discharged;
  - an actuator to control the valve to supply air;
  - an actuator to control the valve to discharge air;
- means for connecting said equipment to the pipeline;
- means for transferring air to said floater;
- means for actuating the actuator to control the valve (AP) to supply air in function of a predefined level in the floater;
- means for actuating the actuator to control the valve (RV) to discharge air in function of the distance of the floater itself from the seabed.

Figure 2:
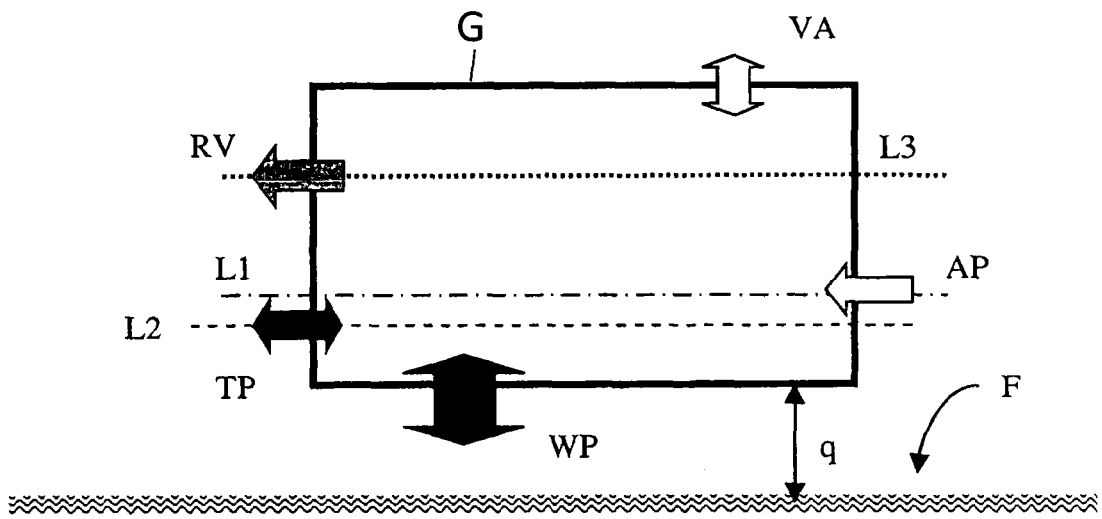
FIG. 2 shows another exemplary embodiment of the submarine pipeline equipment.

With the help of FIG. 2 we briefly describe it.

Said "active" floater is a prismatic container always having two passages and two optional passages:
- an inlet/outlet bidirectional passage for the water (hole) (WP)
- a monodirectional inlet passage for the air—made up of a valve (AP)
- a possible inlet/outlet bidirectional "overflow" control passage—made up of at least one hole (TP)
- a possible inlet/outlet bidirectional floater flooding passage—made up of a valve (VA)
- a monodirectional air outlet passage—made up of a valve (RV).

The passage RV is an air outlet passage placed at a desired level L3 to be able to evacuate the air inside the floater leaving a residual volume which ensures a residual buoyancy. L3 can, however, correspond to the top of the floater that, in this case, has a completely variable buoyancy. RV is made up of a valve that is actuated in function of the distance q (altitude) of the floater from the seabed F. In particular, when a predetermined altitude threshold q is reached (exceeded) the valve RV is opened discharging the air inside the floater into the surrounding environment, and thus the floater loses buoyancy. The measurement of the depth and the opening of the valve can be made with various devices (for example, acoustic measurement of the depth and electrically controlled valve) or simply with one purely mechanical device made up of a free chain with the end part in contact with the seabed and connected to a device with counterweights that actuates the valve. The valve can be of the "on-off" type with two states open/closed or of the proportional type, with a port that can vary from 0 to 100% of the maximum passage in function of the amount by which the threshold is exceeded. In a further embodiment of the active floater, in order to improve the response of the system, the hole WP is calibrated as already described for the passive floater so that the outflow of the water is slowed down, in the case there is a sudden ascending motion of the floater and thus an expansion of the air contained therein. In this case the floater must be sized so as to withstand overpressure.

The control logic of the valves of the floaters taken individually is, in normal operation conditions, given in the following table:

| Floater | Valve | The floater ascends | The floater descends |
|---------|-------|---------------------|----------------------|
| Passive | AP | Remains closed | It opens* to restore the level L1 reduced due to the air compression |
| | TP | When level L2 is reached it discharges excess air | (unsubstantial) |
| | WP | Allows water to be evacuated by the buoyancy of the air expansion | Allows the water to flow without overpressure |
| Active | AP | Remains closed until RV intervenes then it opens* when the level L1 is lost | It opens* to restore the level L1 reduced due to the air compression |
| | TP | When the level L2 is reached it discharges excess air | (unsubstantial) |
| | RV | When the threshold depth is passed it opens* | At a depth lower than the threshold it remains closed or closes* if previously open (reverse motion of the floater) |

*The opening and the closing of the valves are conditioned by the presence of a "dead band" that, around the threshold value of activation, does not let them change state. The dead band ensures a better control stability.

There is a temporary condition for which the valves AP and RV can be simultaneously opened, with the simultaneous insertion of air from AP and evacuation from RV. This occurs when the depth q is over the threshold and due to the air evacuation from RV the level L1 is lost.

The second object of the present invention is the system for the submarine pipeline towing which substantially comprises:

pulling means connected to said pipeline by means of a pulling head for the pulling of the same;

a series of equipment, connected to the pipeline itself, each substantially made up of a variable or partially variable buoyancy floater, a floater (G), of a prismatic shape with a horizontal or vertical axis, with a variable or partially variable buoyancy, whose lower base is at least partially open by means of an opening or hole (WP) to operate as an "air chamber", having:

at least one inlet (AP), made up of a valve, through which air is supplied;

at least one outlet (RV), made up of a valve, through which air is discharged;

a possible inlet/outlet bidirectional "overflow" control passage, made up of a hole (TP);

a possible inlet/outlet bidirectional floater flooding passage, made up of a valve (VA);

an actuator to control the valve to supply air actuated by means in function of a predefined level in the floater;

an actuator to control the valve to discharge air actuated by means in function of the distance of the floater itself from the seabed;

means for supplying compressed air to the floaters;

a series of equipment made up of fixed buoyancy floaters.

The pulling means can be for example metallic or synthetic cables connected to ground winches or to tows or to other naval means.

The means for providing compressed air can be selected for example amongst compressors or storage tanks connected to pipeline for conveying air (common rail). Further object of the present invention is the submarine pipeline towing method carried out by means of pulling elements and the use of a series of equipment, connected to the pipeline itself, substantially containing the floaters, a part of which has a fixed buoyancy and another part has a variable or partially variable buoyancy which, placed in a predetermined position and at predetermined intervals, confer to the pipeline a changeable buoyancy in function of the distance from the bottom so as to obtain a "festoon-like" pipeline configuration, i.e., with suspended pipeline sections, at the floaters, alternating with supporting sections, characterised in that each floater, with a variable or partially variable buoyancy, is substantially made up of the equipment claimed in claims 1, 2 and/or 3.

The pipeline is typically made up of a series of bars of pipeline with a standard length of 12 m (or multiples). Amongst its most important characteristics there is the so called residual weight Wr—overall weight of the pipeline immersed not flooded—resulting from the difference between the weight in air of the various components (steel pipeline, internal and external coatings, weighting down in cement or shotcrete) and the hydrostatic buoyancy consequent to the immersion in water. Also the lineic weight residue wr expressed in unit weight over unit length, is used. Actually the weight Wr (and wr) is nominal since there can be various uncertainties due both to the machining tolerances (steel thickness, coating thickness, weighting down thickness, density of the various materials) as well as due to various phenomena which cannot be controlled well (for example, soaking of the shotcrete, depositing of material on the pipeline, etc.). Such uncertainties, expressed in terms of $\Delta Wr$ ($\Delta wr$) can be, in relative terms, very high. Because of this fact, it is not easy to determine the buoyancy really necessary to reduce the value of Wr (wr) to an acceptable number for the towing operations. Moreover, the floaters themselves, coupled with the pipeline, contribute to the uncertainty because the buoyancy they confer is not deterministically defined due to the machining tolerances etc. etc. In order to avoid these uncertainties and to ensure a safe effective reduction of the towing forces, the floaters are mounted with a sequence that follows a numerous quantity of passive floaters subsequently mounted to one another and at a distance multiple of the number of bars (one for each bar; one for every two bars etc. according to the necessity) separated by a few active floaters to define a series of so called festoons. The actual configuration of the floaters (number of passive floaters and the distance from one another; number of active floaters) depends on the characteristics of the project (weight and line length, uncertainties, etc.). The number of passive floaters can preferably be from 2 to 20 times greater than that of the active floaters (the greater the uncertainties, the greater the number of active floaters is necessary).

The number of passive floaters is thus determined based upon a Wr. The number of the active ones also by $\Delta Wr$. The buoyancy conferred by the group of active and passive floaters is exaggerated respect to that necessary to allow a vertical "pulsing" movement of the pipeline which can tend to separate itself from the bottom, with a temporary reduction of the friction and thus of the necessary pull. The active floaters ensure that the line does not actually become unstable and does not get out of control. The motion can be locally ascending with a rapid return to the resting position at the bottom thanks to the intervention of the valve RV which acts as a sort of "safety valve". Moreover, thanks to the suitably choked calibrated hole WP, the whole line has slow response times with respect to disturbances of the vertical equilibrium depth, thus allowing the valve RV to act before the line has lifted too far. As usual in these operations, the floaters are connected to the pipeline in a removable manner (for example, through a metallic band with a slip hook).

As far as the arrangement of the floaters is concerned, it is preferable that the variable buoyancy ones are arranged near to the beginning and the end of each "festoon".

Further information on the process can be found in the two aforementioned applications WO2006/045357 and WO2008/017463 the content of which is incorporated in the present application as a reference.

EXAMPLE

One example of towing operations comprises the sequence:
- (pre-towing): construction of the pipeline from a suitable pontoon and the operation of laying the pipeline on the seabed (floaters flooded through opening of VA). The floaters are preinstalled during the construction of the pipeline with the common air supplying pipeline already installed and connected to the floaters (fixed to the pipeline). Abandoning of the line on the bottom with the floaters connected and flooded, in a stable position
- closing of the valves VA; connection of the towing cable to the head of the pipeline; connection of the air supplying pipeline to the compressors
- insertion of air into the floaters which gradually gain buoyancy
- beginning of the towing operations, which occur with the pipeline "pulsing" on the vertical plane
- when the destination is reached, release of the floaters from the pipeline.

The invention claimed is:

1. Submarine pipeline towing equipment comprising:
a floater of a prismatic shape with a horizontal or vertical axis, with a variable or partially variable buoyancy, whose lower base is at least partially open by an opening or hole to operate as an air chamber, and including
at least one inlet including a first valve through which air is supplied;
at least one outlet including a second valve through which air is discharged;
an actuator to control the first valve to supply air;
an actuator to control the second valve to discharge air;
a connector configured to connect the equipment to the pipeline;
an air source configured to transfer air to the floater;
a first controller configured to control the first valve to supply air in function of a predefined level in the floater;
a second controller configured to control the second valve to discharge air in function of distance of the floater itself from a seabed; and
an inlet/outlet bidirectional overflow control passage, including at least one hole.

2. Submarine pipeline towing equipment comprising:
a floater of a prismatic shape with a horizontal or vertical axis, with a variable or partially variable buoyancy, whose lower base is at least partially open by an opening or hole to operate as an air chamber, and including
at least one inlet including a first valve through which air is supplied;
at least one outlet including a second valve through which air is discharged;
an actuator to control the first valve to supply air;
an actuator to control the second valve to discharge air;
a connector configured to connect the equipment to the pipeline;
an air source configured to transfer air to the floater;
a first controller configured to control the first valve to supply air in function of a predefined level in the floater;
a second controller configured to control the second valve to discharge air in function of distance of the floater itself from a seabed; and
an inlet/outlet bidirectional floater flooding passage, including a third valve.

3. A submarine pipeline towing system comprising:
a first series of equipment, connected to the pipeline itself, each including a variable or partially variable buoyancy floater whose lower base is at least partially open by an opening or hole to operate as an air chamber, and including
at least one inlet including a first valve through which air is supplied;
at least one outlet including a second valve through which air is discharged;
an inlet/outlet bidirectional overflow control passage including a hole;
an inlet/outlet bidirectional floater flooding passage including a third valve;
an actuator to control the first valve to supply air actuated function of a predefined level in the floater;
an actuator to control the second valve to discharge air actuated by function of a distance of the floater itself from a seabed; and
an air source configured to supply compressed air to the floaters; and
a second series of equipment including fixed buoyancy floaters whose lower base is at least partially open by an opening or hole to operate as an air chamber.

4. A process of submarine pipeline towing, comprising:
towing the pipeline by pulling elements and use of a series of equipment, connected to the pipeline itself, including floaters, part of which with a fixed buoyancy and part of which with a variable or partially variable buoyancy which, placed in a predetermined position and at predetermined intervals, confer to the pipeline a graduated buoyancy in function of a distance from the bottom to obtain a festoon-like pipeline configuration, that is with suspended pipeline sections, at the floaters, alternating with supporting sections,
wherein each variable or partially variable buoyancy floater includes the equipment according to claim 1.

5. The process according to claim 4, wherein a number of fixed buoyancy floaters is from 2 to 20 times greater than that of the variable or partially variable buoyancy floaters.

6. The process according to claim 4, wherein the variable buoyancy floaters are arranged near the beginning and the end of each festoon.

7. A submarine pipeline towing system comprising:
a first series of equipment, connected to the pipeline itself, each including a variable or partially variable buoyancy floater whose lower base is at least partially open by an opening or hole to operate as an air chamber, and including at least one inlet including a first valve through which air is supplied,
at least one outlet including a second valve through which air is discharged,
an actuator to control the first valve to supply air actuated function of a predefined level in the floater,
an actuator to control the second valve to discharge air actuated by function of a distance of the floater itself from a seabed; and
an air source configured to supply compressed air to the floaters; and
a second series of equipment including fixed buoyancy floaters whose lower base is at least partially open by an opening or hole to operate as an air chamber, wherein the first series of equipment each include an inlet/outlet bidirectional overflow control passage including a hole, or an inlet/outlet bidirectional floater flooding passage including a third valve.

8. A process of submarine pipeline towing comprising:
towing the pipeline by pulling elements and use of a series of equipment, connected to the pipeline itself, including floaters, part of which with a fixed buoyancy and part of which with a variable or partially variable buoyancy which, placed in a predetermined position and at predetermined intervals, confer to the pipeline a graduated buoyancy in function of a distance from the bottom to obtain a festoon-like pipeline configuration, that is with suspended pipeline sections, at the floaters, alternating with supporting sections,
wherein each variable or partially variable buoyancy floater includes the equipment according to claim 2.

* * * * *